R. J. BURROWS.
PROPELLER SHAFT BEARING FOR MOTOR VEHICLES.
APPLICATION FILED JUNE 18, 1917.
1,335,040.
Patented Mar. 30, 1920.
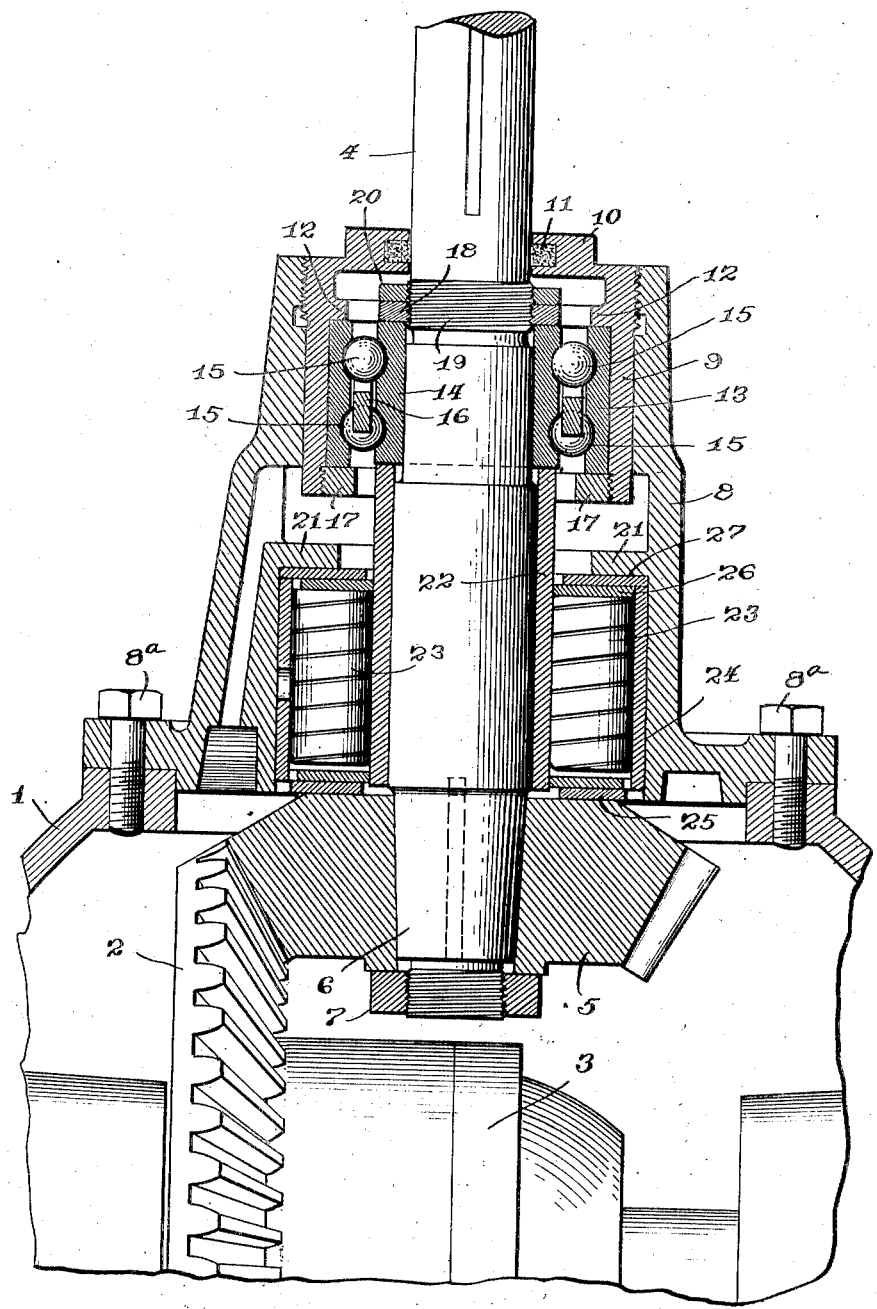

UNITED STATES PATENT OFFICE.

ROBERT J. BURROWS, OF BUCHANAN, MICHIGAN, ASSIGNOR TO CLARK EQUIPMENT COMPANY, OF BUCHANAN, MICHIGAN, A CORPORATION OF MICHIGAN.

PROPELLER-SHAFT BEARING FOR MOTOR-VEHICLES.

1,335,040.

Specification of Letters Patent.   Patented Mar. 30, 1920.

Application filed June 18, 1917.   Serial No. 175,508.

*To all whom it may concern:*

Be it known that I, ROBERT J. BURROWS, a citizen of the United States, and a resident of Buchanan, in the county of Berrien, State of Michigan, have invented certain new and useful Improvements in Propeller-Shaft Bearings for Motor-Vehicles, of which the following is a specification, reference being had to the accompanying drawing.

My invention relates to motor vehicles and has particularly to do with such vehicles in which the propelling power is applied to the usual differential gearing by means of a propeller shaft connected with any suitable source of power such as an internal combustion engine mounted at the forward portion of the vehicle. As my invention has to do only with the mounting of the rear section or member of the propeller shaft I have illustrated only such parts as are necessary to an understanding of my improvements, and it will be understood that such improvements may be applied to any form of vehicle to which they are adapted. The object of my invention is to provide anti-friction bearings for supporting the rear portion of the propeller shaft, of such construction that the parts may readily be assembled and any necessary adjustment of the bearings may readily be effected. I accomplish this object as illustrated in the drawing and as hereinafter described. What I regard as new will be set forth in the claims.

In the accompanying drawing, in which the figure is a horizontal sectional view of the central part of the rear axle housing of a motor vehicle showing the propeller shaft and its bearings, 1 indicates the rear axle housing, 2 the usual main drive gear, 3 the housing which incloses the usual differential gearing, and 4 the rear portion or section of the propeller shaft, which carries at its inner end a beveled pinion 5 which meshes with and drives the main drive gear 2. As shown at 6 in the drawing, the inner end of the propeller shaft 4 is reduced and tapered to receive the pinion 5, which is secured thereon by a nut 7 screwed upon the inner end of the shaft. 8 indicates a housing for the anti-friction bearings of the propeller shaft, said housing being secured to the housing 1 by bolts 8ª so that it may readily be removed. The outer or forward end of the housing 8 is provided with internal screw-threads and in it is fitted a cage 9, the outer portion of which is threaded to screw into the housing 8. The outer portion of the cage 9 is provided with an internally-projecting flange 10 which fits closely upon the shaft 4 and is provided with a groove in which is placed a felt or other washer 11 which bears upon the shaft and prevents leakage of oil between the shaft and said flange. 12 indicates an internally-projecting flange in the cage 9 adjacent to the flange 10, the opening of the flange 12 being of considerably greater diameter than the shaft 4. The purpose of the flange 12 is to form a shoulder against which abuts a band 13 which forms the outer member of a ball bearing. 14 indicates a smaller band which forms the inner member of the ball bearing and is fitted closely upon the shaft 4. 15 indicates balls fitted in raceways provided in the two bands 13—14, and 16 indicates a spacing ring plate of the usual type mounted between the two sets of balls. The band 13 fits closely in the cage 9 and is held in position by an annular cap plate 17 which is screwed into the inner end of the cage as shown and bears against the adjacent end of the band 13. By removing the cap plate the ball bearing as as whole may readily be removed. 18 indicates a ring which is screwed upon threads 19 provided on the shaft 4 intermediately of its length, said threads being placed so that they normally lie adjacent to the ball bearing and between said bearing and the flange 10 of the cage 9. Said ring bears against the outer or forward end of the band 14 and is locked in position by a similar ring 20 also screwed upon the threads 19 as shown. 21 indicates an internally-projecting flange or abutment provided in the housing 8 between the cage 9 and the inner end of said housing. 22 indicates a sleeve mounted on the shaft 4 between the band 14 and the pinion 5, the forward end of said sleeve bearing against said band. 23 indicates roller bearings mounted in the cage 9 between the flange 21 and the pinion 5, the rollers of said bearing running on the sleeve 22. 24—25 indicate plates between the gear 5 and the adjacent ends of the rollers 23, and 26—27 indicate similar plates between the opposite ends of said roller and the flange 21, From the foregoing description it will be apparent that the cage 9 may be adjusted longitudinally of the housing 8 and that when so adjusted it carries with it the ball bearing and the propeller shaft. It will also be apparent that the shaft may be adjusted lengthwise in the ball bearing by adjusting the rings 18—20, and that the latter adjustment also adjusts the position of the bearing plates at the ends of the rollers 23 because of the movement of the pinion 5 with said shaft. In practice the parts are assembled in the housing 8 and the position of the shaft with reference to the ball bearing is adjusted before the housing 8 is applied to the differential housing 1. By then adjusting the cage 9 the position of the pinion 5 with reference to the gear 2 may be accurately adjusted. The provision of the two sets of bearings, i. e. the ball bearings and the roller bearings, furnishes support for the shaft at separated points, thus holding it in proper operative position and insuring the proper coöperation of the pinion 5 and the gear 2.

What I claim as my invention and desire to secure by Letters Patent, is—

1. A motor vehicle propeller shaft bearing comprising a housing, a ball bearing mounted therein and adjustable longitudinally thereof, a propeller shaft mounted in said bearing and longitudinally adjustable therein independently thereof, and a pinion mounted on the inner end portion of said shaft.

2. A motor vehicle propeller shaft bearing comprising a housing, a ball bearing mounted therein and adjustable longitudinally thereof, a propeller shaft mounted in said bearing and longitudinally adjustable therein, a pinion mounted on the inner end portion of said shaft, and a bearing for said shaft mounted in said housing between said ball bearing and said pinion.

3. A motor vehicle propeller shaft bearing comprising a housing, a ball bearing mounted therein and adjustable longitudinally thereof, a propeller shaft mounted in said bearing and longitudinally adjustable therein, a pinion mounted on the inner end portion of said shaft, a bearing for said shaft mounted in said housing between said ball bearing and said pinion, and an abutment in said housing between said bearings.

4. A motor vehicle propeller shaft bearing comprising a housing, a cage adjustably mounted in said housing, a ball bearing mounted in said cage, a propeller shaft mounted in said ball bearing and adjustable longitudinally of said housing with said cage independently of said ball bearing, and a pinion mounted on the inner end portion of said shaft.

5. A motor vehicle propeller shaft bearing comprising a housing, a cage adjustably mounted in said housing, a ball bearing mounted in said cage, a propeller shaft mounted in said ball bearing and adjustable longitudinally of said housing with said cage, a pinion mounted on the inner end portion of said shaft, and a roller bearing in said housing between said pinion and said ball bearing.

6. A motor vehicle propeller shaft bearing comprising a housing, a cage adjustably mounted in said housing, a ball bearing in said cage, a propeller shaft mounted in said ball bearing and longitudinally adjustable therein independently thereof, and a pinion mounted on the inner end portion of said shaft.

7. A motor vehicle propeller shaft bearing comprising a housing, a cage adjustably mounted in said housing, a ball bearing in said cage, a propeller shaft mounted in said ball bearing and longitudinally adjustable therein, a pinion mounted on the inner end portion of said shaft, and a roller bearing in said housing between said pinion and said ball bearing.

8. The combination with the drive gear of a motor vehicle axle, and a housing therefor, of a propeller shaft, a pinion mounted on the inner end portion of said shaft and meshing with said drive gear, a second housing mounted on said first-mentioned housing and surrounding said shaft, an annular flange projecting inwardly from said second housing intermediately thereof, a roller bearing mounted in said second housing between said flange and said pinion, a cage adjustably mounted in the outer end portion of said second housing, ball bearings for said shaft mounted in said cage and adjustable therewith, and means for adjusting said shaft longitudinally in said bearings.

9. The combination with the drive gear of a motor vehicle axle, and a housing therefor, of a propeller shaft, a pinion mounted on the inner end portion of said shaft and meshing with said drive gear, a second housing mounted on said first-mentioned housing and surrounding said shaft, an annular flange projecting inwardly from said second housing intermediately thereof, a roller bearing mounted in said second housing between said flange and said pinion, a cage adjustably mounted in the outer end portion of said second housing, ball bearings for said shaft mounted in said cage and adjustable therewith, and a ring nut secured on said shaft and adapted to engage said ball bearing to adjust said shaft longitudinally therein.

10. The combination with the drive gear of a motor vehicle axle, and a housing therefor, of a propeller shaft, a pinion mounted on the inner end portion of said shaft and meshing with said drive gear, a second housing mounted on said first-mentioned housing and surrounding said shaft, an annular flange projecting inwardly from said second housing intermediately thereof, a roller bearing mounted in said second housing between said flange and said pinion, a cage adjustably mounted in the outer end portion of said second housing, ball bearings for said shaft mounted in said cage and adjustable therewith, means for adjusting said shaft longitudinally in said bearings, and a sleeve on said shaft between said ball bearing and said pinion, said sleeve fitting within said roller bearing.

11. The combination with the drive gear of a motor vehicle axle, and a housing therefor, of a propeller shaft, a pinion mounted on the inner end portion of said shaft and meshing with said drive gear, a second housing mounted on said first - mentioned housing and surrounding said shaft, a cage adjustably mounted in the outer end portion of said second housing, said cage being open at its inner end and having an inwardly projecting flange at a point removed from its inner end, a ball bearing fitted in said cage and abutting against the flange therein, a cap ring screwed into said cage for holding said ball bearing therein, and a ring screwed upon the propeller shaft and engaging the outer portion of said ball bearing.

12. The combination with the drive gear of a motor vehicle axle, and a housing therefor, of a propeller shaft, a pinion mounted on the inner end portion of said shaft, and meshing with said drive gear, a second housing mounted on said first-mentioned housing and surrounding said shaft, a cage adjustably mounted in the outer end portion of said second housing, said cage being open at its inner end and having an inwardly projecting flange at a point removed from its inner end, a ball bearing fitted in said cage and abutting against the flange therein, a cap ring screwed into said cage for holding said ball bearing therein, a ring screwed upon the propeller shaft and engaging the outer portion of said ball bearing, a sleeve mounted on said shaft between said ball bearing and said pinion, and a roller bearing in said second housing and engaging said sleeve.

13. A motor vehicle propeller shaft bearing, comprising a housing, a ball bearing mounted therein and adjustable longitudinally thereof, a propeller shaft mounted in said bearing, a pinion mounted on the inner end portion of said shaft, and a radial antifriction bearing for said shaft mounted in said housing between said ball bearing and said pinion.

ROBERT J. BURROWS.